March 20, 1962  M. L. FREEMAN  3,025,881
VALVES
Filed Feb. 21, 1957
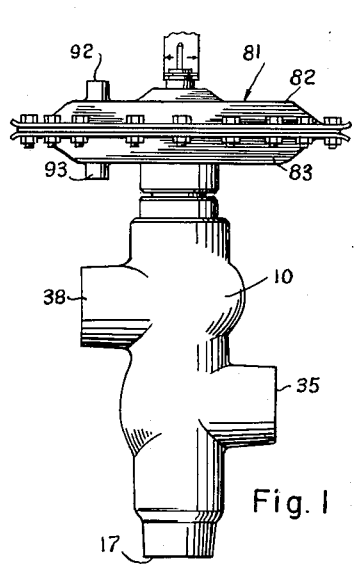
Fig. 1
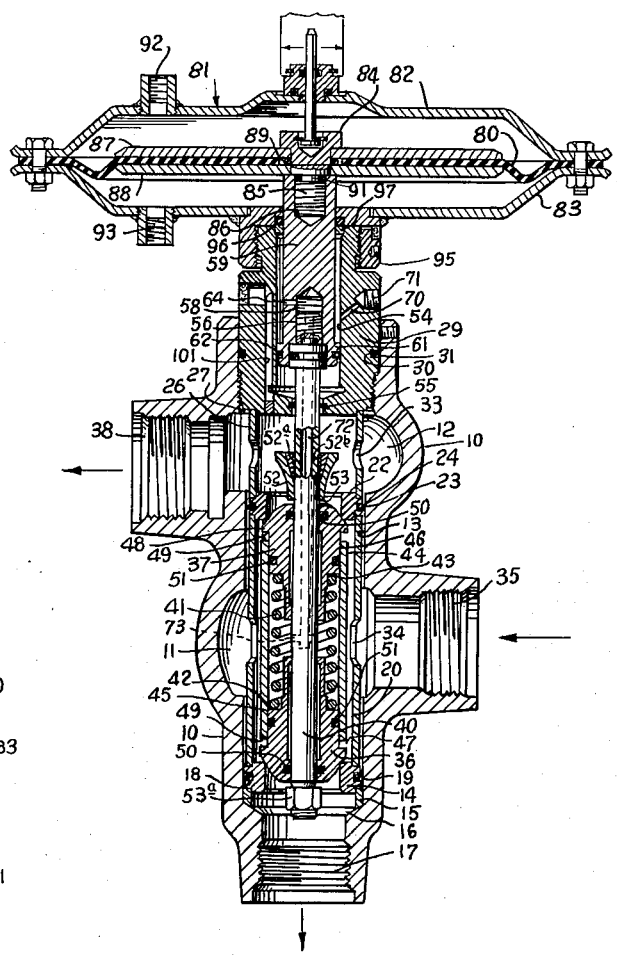
Fig. 2
Fig. 3
Mathew L. Freeman
INVENTOR
BY
ATTORNEY 3,025,881
VALVES
Mathew L. Freeman, 7018 Hartland Ave., Houston, Tex.
Filed Feb. 21, 1957, Ser. No. 641,509
8 Claims. (Cl. 137—627.5)

This invention relates to valves and more particularly to a fail safe three-way valve. This application is a continuation in part of my co-pending application, Serial No. 494,180, filed March 14, 1955.

An object of this invention is to provide a new and improved three-way valve having a fail safe action.

Another object is to provide a new and improved three-way valve having a pair of separately movable valve plugs for selectively directing flow of fluid through either of two outlets of the valve, and wherein the valve plugs each seat independently of the other to provide a sure tight seal to cut off flow therepast.

Still another object of the invention is to provide a three-way valve having a construction which shields the operative elements of the valve from the fluid passing through the valve whereby such operative elements are protected from the corrosive action of the fluids and from the erosive action of sand or other particles carried by the fluid.

A further object of the invention is to provide a three-way valve having a single operator for selectively seating each or both of the two valve plugs, movement of the operator in one direction unseating one of the valve plugs, and movement in the opposite direction unseating the other valve plug.

A still further object of this invention is to provide a valve of the character described having the two plug members which are independently separately operable and which are so arranged that the valves are each in tightly sealed positions closing off all flow through the valve when shifting flow from one outlet to the other and vice versa.

An important object of this invention is to provide a new and improved valve of the type described, wherein the two plug members are telescoped in opposite ends of a tubular shield, and wherein means are provided to conduct back pressure into the shield between the two plugs to counteract or balance the fluid pressure acting on such valve plugs to prevent their opening due to excessive back pressure.

Another object of the invention is to provide a valve of the type described wherein the plugs are hollow to receive an elongate operator and are provided with resilient sealing means for sealing between the plugs and the operator and between the plugs and the tubular shield.

Another object of the invention is to provide a valve, of the type described, wherein the plugs are provided with seal surfaces engageable by corresponding surfaces of the tubular shield and of the operator which, when abutting one another, provide secondary metal to metal seals which tend to prevent leakage between the plugs and the tubular shield and between the plugs and the operator in the event of malfunction of the resilient seals.

Still another object of the invention is to provide a new and improved valve, of the type described, wherein the operator is provided with a passage communicating with the outlet of the valve and the interior of the tubular shield whereby the back pressure from the outlet is directly transmitted to the interior of the tubular shield to balance the valve plugs against opening due to back pressure.

A still further object of the invention is to provide a new and improved valve, of the type described, wherein the operator is provided with a passage communicating with the interior of the tubular shield and with an opening in the valve body whereby back pressure from a flow line downstream between the valve a and common separator to which one of the outlets is connected may be transmitted to the interior of the tubular shield to balance the valve plugs against opening due to back pressure.

Still another object of the invention is to provide a three-way valve, of the type described, of simple economical construction which may be easily assembled and disassembled.

A further object of the invention is to provide a valve, of the type described, whose operative elements may be dis-assembled and removed for replacement, cleaning or repair while the valve body itself remains connected in the line whose flow it controls.

A still further object of the invention is to provide a valve, of the type described, wherein the tubular shield protects a large area of the plugs from the inlet pressure, whereby the pressure drop across the valve seats is minimized, thus minimizing wear and cutting of the valve seats.

Additional objects and advantages of the invention will be readily apparent from the reading of the following description of devices constructed in accordance with the invention, and reference to the accompanying drawings thereof, wherein:

FIGURE 1 is a side view of a three-way valve embodying the invention;

FIGURE 2 is an enlarged vertical sectional view of the valve shown in FIGURE 1 and having two separately acting valve plugs connected by a stem, the valve plugs being separately selectively movable by diaphragm actuated operator to permit flow of the fluids through either of two outlets, the operator being provided with a longitudinal passage communicating with a bore in a valve bonnet connected in the valve body whereby back pressure from one of the outlets may be transmitted to the interior of the valve to balance the two valve plugs to prevent opening thereof due to back pressure; and FIGURE 3 is a vertical, sectional view of a modified form of the valve plug assembly wherein the operator is provided with a passage communicating with one of the outlets and with the interior of the tubular shield to balance the valve plugs against opening due to back pressure.

Referring now particularly to FIGURES 1 and 2 of the drawings, the valve body 10 is provided with a lower compartment 11 and an upper compartment 12 which are connected by a circular aperture or passage 13. A lower valve seat 14 is disposed below the lower compartment 11 on an annular ring 15 which rests on an annular shoulder 16 surrounding the lower outlet 17 of the body. The annular valve seat 14 is provided with an outer annular recess or groove 18 wherein is received an O-ring or sealing means 19 which seals between the body and the valve seat. A spacer sleeve 20 is supported on the valve seat 14 and extends upwardly through the lower compartment into the circular aperture 13, where it supports an upper valve seat 22 in the circular aperture. The upper valve seat 22 is provided with an annular outer groove 23 in which is received the sealing means or O-ring 24 which seals between the body and the upper valve seat. An upper spacer sleeve 26 is supported on the upper valve seat 22 and extends upwardly through the upper compartment 12 into a service opening or aperture 27 of the valve body 10 into which is threaded a valve bonnet 29 whose lower end engages the upper end of the upper spacer sleeve 26 to hold the valve seats and spacer sleeves in position in the valve body. The valve bonnet 29 is provided with an annular external recess 30 which receives a sealing means or O-ring 31 which seals between the valve body and the valve bonnet to seal therebetween.

The upper and lower spacer sleeves are provided with lateral apertures 33 and 34, respectively, so that fluid may flow from the inlet 35 of the valve body through the lower compartment 11, the lateral apertures 34 and through the lower valve seat 14 to the lower outlet 17 when a lower valve plug 36, which normally seats on the lower valve seat 14, is in raised open position. Likewise, when the upper valve plug 37, which normally is seated on the upper valve seat 22 closing the latter is in a lowered opened position, fluid may flow from the inlet 35 to the lower compartment 11 through the lateral apertures 34, the interior of the lower spacer sleeve 20, the lateral apertures 33 and the upper compartment 12 to the upper outlet 38 of the valve body.

The valve plugs 36 and 37 are slidably mounted on an inner stem 40 and are biased apart toward their respective valve seats by a spring 41, whose opposite ends bear against the opposed annular shoulders 42 and 43 of the lower and upper valve plugs, respectively. A tubular shield or sleeve 44 surrounds the spring 41 and slidably engages the reduced portions 45 and 46 of the inner ends of the valve plugs 36 and 37, respectively. The inwardly facing annular shoulders 47 and 48 of the lower and upper valve plugs, respectively, engage the annular end surfaces 49 of the sleeve 44 to limit longitudinal movement of the tubular shield with respect to the valve plugs. The valve plugs 36 and 37 are provided with inner O-rings 50 which seal between the inner stem 40 and the valve plugs, and the valve plugs are also provided with O-rings 51 which seal between the tubular sleeve 44 and the valve plugs. The annular shoulders 47 and 48 and the annular end surfaces 49 also provide secondary metal to metal seals which minimize leakage between the plugs and the sleeve 49 in the event of malfunction of the O-rings 51.

The elongate inner stem 40 is provided with a ring 52 having a serrated grip means 52a which engage a reduced portion 52b of the inner stem to lock the ring 52 against upward movement on the inner stem due to the locking engagement of the downwardly and inwardly tapered abutting surfaces of the ring and the grip means. The lower annular shoulder or end 53 of the ring is adapted to engage the upper end of the upper valve plug 37 to move it downwardly to an open position out of engagement with the upper valve seat 22. The lower end of the inner stem 40 is threaded and provided with a nut 53a which engages the lower end of the lower valve plug 36 when the inner stem is moved upwardly to move the lower valve plug 36 to an upper raised position where it is out of engagement with the lower valve seat 14. The upper portion of the inner stem 40 extends upwardly into the longitudinal bore 54 of the valve bonnet, and the reduced portion of the longitudinal bore 54 at the lower end of the valve bonnet is provided with an O-ring or seal means 55 which seals between the inner stem and the valve bonnet. The annular shoulder 53 and the nut 53a engage the adjoining ends of the plugs 37 and 36, respectively, to provide secondary metal to metal seals which minimize leakage between the plugs and the inner stem 40 in the event of malfunction of the O-rings 50.

The upper end of the inner stem 40 may be reduced as at 56 and threaded into the downwardly opening internally threaded bore 58 of a diaphragm plunger 59 which extends downwardly into the longitudinal bore 54 of the valve bonnet.

The diaphragm plunger 59 is provided with an external annular flange 61 which slidably engages the internal wall of the longitudinal bore 54 of the valve bonnet and which is provided with an O-ring 62 which seals between the valve plunger and the valve bonnet below a lateral aperture 64 of the valve plunger. The lateral aperture communicates with the internal threaded bore 58 of the plunger 59 above the upper reduced end 56 of the inner stem 40 and with the interior of the longitudinal bore 54 of the valve bonnet. The valve bonnet is also provided with an upwardly extending passage 70 which communicates with the longitudinal bore 54 of the valve bonnet above the flange 61 of the diaphragm plunger and with the exterior of the valve bonnet through a threaded bore 71, which is adapted to receive any suitable fitting through which pressure may be admitted to the valve bonnet passage 70.

The inner stem 40 is provided with an internal longitudinal passage 72 which extends downwardly from the upper end thereof and communicates with the upper end of the threaded bore 58 and of the diaphragm plunger. The lower end of the inner stem passage 72 connects with a lateral or transverse passage 73 which communicates with the interior of the tubular shield 44 between the upper and lower valve plugs.

It will now be apparent that a fluid pressure may be admitted to the interior of the tubular shield 44 between the upper and lower valve plugs to balance the valve plugs toward closed positions against any predetermined pressure, such as the back pressure which might develop in the outlet 17. It will be apparent that such balancing pressure may be effected from the fluid pressure present in a downstream flow line between the valve and a common separator, if the outlet 17 is connected to such downstream flow line and if suitable conduit means extend between the common separator and the threaded bore 71 of the valve bonnet. In this manner the pressure within the tubular shield 44 is made to vary in accordance with the variations in the back pressure and the valve outlet 17 to balance the upper and lower valve plugs against opening movement due to back pressure acting on the outer ends of said valve plugs.

The diaphragm plunger 59 is connected at its upper end to a diaphragm 80 disposed in a housing 81 composed of upper and lower dished members 82 and 83 between which the diaphragm is confined. The diaphragm plunger may be connected to the diaphragm 80 by means of a cap screw 84 having a reduced lower end 85 which is threaded in an upwardly opening internally threaded bore 86 of the diaphragm plunger, said cap screw holding the load bearing plates 87 and 88 disposed on opposite sides of the diaphragm 80 firmly secured to the diaphragm plunger.

Fluid may be introduced into the upper part of the housing through an inlet 92 to cause the plunger 59 to be moved downwardly, while the fluid introduced into the lower part of the housing through the inlet 93 will act on the diaphragm to cause the diaphragm plunger to be moved upwardly. Fluids under different pressures may be introduced simultaneously through the inlets 92 and 93 so that the movement of the diaphragm plunger will be caused by the differential of such pressures.

The housing 81 may be mounted on the valve bonnet 29 by means of a sleeve 95 welded to the lower dished member 83 and threaded on the upper externally threaded portion of the valve bonnet. The sleeve 95 may be provided with a suitable downwardly facing recess in which is disposed an O-ring 96 surrounding the diaphragm plunger 59 and resting on a ring 97 supported by a suitable annular shoulder of the valve bonnet.

The valve bonnet is provided with a suitable vent 101 which communicates with the longitudinal bore 54 of the valve bonnet below the flange 61 of the diaphragm plunger whereby air trapped below the flange as the diaphragm plunger moves downwardly may escape to the atmosphere and air may enter into the longitudinal bore 54 from the atmosphere as the diaphragm plunger moves upwardly.

It will now be apparent that the valve plunger 59 and the inner stem 40 may be considered an operator which is moved by the diaphragm 80 to move the upper and lower valve plugs 37 and 36, respectively, to open positions. When the diaphragm plunger 59 and the inner stem 40 are moved downwardly, the annular downwardly facing shoulder 53 of the ring 52 engages the upper end of the upper valve plug 37 to move the upper valve plug downwardly from its valve seat 22 against the resistance of the spring 41 and thus permit fluid from the inlet 35 to flow upwardly through said seat and out the outlet 38. When the diaphragm plunger 59 is moved upwardly, the nut 53a of the lower end of the inner stem 40 engages the bottom end of the lower valve plug 36 to raise the lower valve plug 36 from its valve seat 14 and thus permit fluid to flow from the inlet 35 downwardly through said seat and out the outlet 17.

The resilient spring 41 exerts a yielding biasing force which tends to move the valve plugs apart and into engagement with the respective valve seats, so that the force exerted by the spring tends to close the valve and prevent any flow of fluid from the inlet 35 through the valve body. Also, the tubular shield or sleeve 44 shields or protects about 95 percent of the seat area of the plugs from the inlet pressure, whereby only about 5 percent of the seat area of the plugs is exposed to the inlet pressure. As a result, the plugs are fairly easily movable to open position against the force exerted on them by the inlet pressure, but such force does aid the spring 41 in holding the plugs tightly on their seats once the plugs are in closed positions on their seats 14 and 22. It will also be apparent that the provision of the passages 72 and 73 in the inner stem, the lateral passage 64 of the valve plunger, and the passage 70 of the valve bonnet permits a balancing fluid pressure to be introduced into the tubular shield 44 which may be made to vary in accordance with the back pressure at the outlet 17 or the outlet 18, as may be desired, to prevent the valve plugs from being moved toward open position by excessive back pressures at the outlets.

The upper surface of the annular flange 61 of the diaphragm plunger 59 is of such dimension that the balancing fluid pressure from the common separator acts on such upper surface with a downward force equal to the upward force exerted by the back fluid pressure at the outlet 17 on the lower end of the inner stem 40. Accordingly, the operator will be seen to be balanced as regards the back pressure at the outlet 17 so that variations in such back pressure will not affect operation of the valve and so that the operator can be moved downwardly by a relatively small force exerted by the diaphragm even though the back pressure at the outlet 17 which exerts an upward force on the lower end of the inner stem 40 is relatively great. The back pressure at the outlet 17 may be very great, as much as 5000 p.s.i., so that such balancing of the operator, as regards the back pressure at outlet 17, is necessary to prevent undesired upward movement of the operator.

It will be obvious that the three-way valve is a fail safe valve, and the spring action of the spring 41 tends to hold the valve plugs in closed position preventing flow of fluid through the valves, and that the pressure of the fluid entering in through the inlet 35 also tends to cause the valve plugs to stay in closed position. In addition, the provision of passages communicating with the interior of the tubular shield 44 between the valve plugs permits balancing pressures to be introduced into the interior of the tubular shield which may vary in accordance with the back pressures whereby any increase in the back pressures acting on either of the valve plugs will cause corresponding increase in the pressure within the tubular shield 44 so that the valve plugs will not be displaced from their valve seats by any increases or variations in the back pressures.

It will be apparent that the valve seats 14 and 22 are movably or floatingly mounted in the valve body so that these elements are free to move or adjust slightly in position so that they maintain tight seals though there is slight misalignment of parts or when the valve body itself distorts or stretches under the high fluid pressures to which it is subjected.

In FIGURE 3 is illustrated a modified form of the three-way valve wherein the inner stem 40 is provided with a longitudinal passage 150 which extends upwardly from the lower end of the inner stem and connects with a transverse passage 151 which communicates with the interior of the tubular shield 44 between the upper and lower valve plugs 37 and 36, respectively. It will be apparent that in this modified form of the valve, the back pressure at the outlet 17 is transmitted to the interior of the tubular shield 44 by means of the passages 150 and 151 whereby the pressure biasing the valve plugs out toward their valve seats varies in accordance with the back pressure in the outlet 17 to thus balance the forces acting on the valve plugs and prevent undesired opening of the lower valve plug 36 due to increases in the back pressure at the outlet 17.

It will be apparent that the significant difference between the valve illustrated in FIGURE 3 and the valve illustrated in FIGURE 2 is that the back pressure at the outlet 17 is directly transmitted to the interior of the tubular shield 44 whereas in the valve illustrated in FIGURE 2 clean gas from a separator connected downstream of the outlets 17 or 38 may be admitted into the shield 44 through the passage 70 and, if desired, through a pressure booster which allows the balancing pressure introduced through the passage 70 to exceed the pressure at the outlets and ensure a very tight seal.

It will also be apparent that the valve may be easily dis-assembled while its body 10 remains connected in a line simply by unscrewing the valve bonnet 29 from the service opening aperture or opening 27 of the valve body, whereupon the valve seats and various other elements of the valve disposed in the valve body are easily removed from the valve body for repair or replacement. After such removal of the valve elements from within the valve body, the nut 53a may be unscrewed from the lower end of the stem 40, whereupon all valve elements on said stem below the bonnet may be readily removed downwardly off said stem. The ring 52 of course may be moved downwardly on the split gripping means 52a which can then be moved downwardly or laterally off the inner stem. The ring 52 can then also be removed downwardly off the inner stem thus freeing the bonnet and the valve elements for removal. The diaphragm housing 81 may in turn be unscrewed from the upper end of the valve bonnet 29 after the nut 53a of the inner stem 40 is taken off the stem or after the stem itself is unscrewed from the plunger 59 so that all O-rings and seals of the valve may be replaced without dis-assembling the diaphragm housing or any of the elements mounted therein.

It will now be apparent that two modified forms of a new and improved three-way valve have been illustrated and described, and that each form of the three-way valve includes a valve body having an inlet and two outlets, a pair of valve plugs each selecting flow of fluid from the inlet to its associated outlet, biasing means simultaneously urging both valve plugs toward closed positions, a control means for selectively and individually moving the plugs toward open positions, and means for introducing a balancing pressure to the valve plugs to hold them against opening due to excessive back pressures and for balancing the control means against downstream back pressures.

The foregoing description of the invention is explanatory only, and changes in the details of the constructions illustrated may be made by those skilled in the art, within the scope of the appended claims, without departing from the spirit of the invention.

What is claimed and desired to be secured by Letters Patent is:

1. A three-way valve including: a valve body having an inlet and two outlets; a pair of valve plugs, one valve plug controlling flow of fluid from the inlet to one of said outlets, and the other valve plug controlling flow of fluid from the inlet to the other of said outlets; means biasing said valve plugs in opposite directions and normally holding said valve plugs in closed position whereby flow of fluid from the inlet to said outlets is prevented; means for selectively moving each of said valve plugs to its open position whereby fluid may flow from the inlet to a selected outlet; shielding means comprising a sleeve extending between said valve plugs, said sleeve cooperating with said valve plugs to define a fluid tight chamber within the sleeve and between said valve plugs, said valve plugs extending outwardly from said sleeve toward closed positions, said plugs each having an area thereon externally of said sleeve exposed to pressure of fluid from the inlet, said pressure of the fluid from the inlet acting on such area of the plugs to tend to move said plugs toward closed positions; and means for conducting a fluid pressure from one of said outlets into said chamber between said plugs to act on said plugs to also bias said plugs toward closed position.

2. A three-way valve comprising: a valve body having a pair of compartments, an inlet and a first outlet communicating with the first of said compartments, a second outlet communicating with the second of said compartments, and an aperture providing communication between said first and second compartments; a first valve plug for closing said first compartment from said first outlet; a second valve plug for closing said aperture; means biasing said valve plugs in opposite directions toward normally closed position; means for selectively moving each of said valve plugs against the force of said biasing means toward an open position whereby fluid may flow from the inlet to a selected outlet; said valve plugs being positioned in said first compartment whereby said plugs are exposed to the pressure of the fluid in the inlet which tends to hold said valve plugs in closed positions; shielding means comprising a sleeve extending between said valve plugs, said sleeve cooperating with said valve plugs to define a fluid tight chamber within the sleeve and between the valve plugs, said valve plugs extending outwardly from said sleeve toward closed positions, said plugs each having an area thereon externally of said sleeve exposed to pressure of fluid from the inlet, said pressure of the fluid from the inlet acting on such areas of the plugs to tend to move said plugs toward closed position; and means for conducting a fluid pressure from one of said outlets into said chamber.

3. A three-way valve comprising: a valve body having a pair of compartments, an inlet and a first outlet communicating with the first of said compartments, a second outlet communicating with the second of said compartments, and an aperture providing communication between said first and second compartments; a first valve plug for closing said first compartment from said first outlet; a second valve plug for closing said aperture; means biasing said valve plugs in opposite directions toward normally closed positions; a stem extending from without the valve body through said second compartment and said aperture into said first compartment; said plugs being mounted on said stem; said stem being slidable with respect to said plugs and being provided with oppositely facing stop means, one of said stop means engaging one of the plugs to move it to open position when the stem is moved in one direction, and the other of said stop means engaging the other plug to move it to open position when the stem is moved in a direction opposite to said one direction; said stop means confining said plugs on said stem; shielding means comprising a sleeve extending between said valve plugs, said sleeve cooperating with said valve plugs to define a fluid tight chamber within the sleeve and between the valve plugs, said valve plugs extending outwardly from said sleeve toward closed positions; said valve plugs having means thereon confining said sleeve movably between said plugs; and means for introducing a variable fluid pressure into said chamber, said body having a service aperture closed by a removable bonnet, said bonnet having an aperture for receiving an end portion of said stem; said stem, said plugs and said sleeve being removable as a unit through said service aperture when said bonnet is removed therefrom.

4. A three-way valve comprising: a valve body having a pair of aligned compartments, an inlet and a first outlet communicating with the first of said compartments, a second outlet communicating with the second of said compartments, an aperture providing communication between said first and second compartments, and a service opening communicating with said second compartment and aligned with said aperture; a first valve seat means disposed in said first compartment between said inlet and said first outlet; a spacer sleeve resting on said first valve seat means and extending through said first compartment into said aperture, said spacer sleeve being provided with port means allowing fluid flow from the inlet into the interior of said spacer sleeve; a second valve seat means disposed in said aperture and resting on said first spacer sleeve; a bonnet removably secured in said service opening; a second spacer sleeve extending between said second valve seat means and said bonnet through said second compartment, said second spacer sleeve being provided with port means allowing fluid flow from the interior of said second spacer sleeve to said second outlet; a first valve plug engageable with said first valve seat means for closing said first compartment from said first outlet; a second valve plug engageable with said second valve seat means for closing said aperture; means biasing said valve plugs in opposite directions toward normally closed position; a stem extending from without said valve body through an opening provided in said bonnet, said compartment and said aperture into said first compartment, said plugs being mounted on said stem, said stem being slidable with respect to said plugs and being provided with oppositely facing stop means, one of said stop means engaging one of said plugs to move it to open position when the stem is moved in one direction and the other of said stop means engaging the other plug to move it to open position when the stem is moved in a direction opposite to said one direction; said stop means confining said plugs on said stem; shield means comprising a shield sleeve extending between said valve plugs, said sleeve cooperating with said valve plugs to define a fluid tight chamber within said sleeve between said valve plugs, said valve plugs extending outwardly from said sleeve into the fluid flow path from said inlet to said valve seat means; said valve plugs having means confining said sleeve slidably between said valve plugs; said stem, sleeve and valve plugs being removable as a unit from said body through said service opening when said bonnet is removed therefrom; said stem having a passage for admitting fluid pressure into said chamber.

5. A three-way valve comprising: a valve body having a pair of aligned compartments, an inlet and a first outlet communicating with the first of said compartments, a second outlet communicating with the second of said compartments, an aperture providing communication between said first and second compartments, and a service opening communicating with said second compartment and aligned with said aperture; a first valve seat means disposed in said first compartment between said inlet and said first outlet; a spacer sleeve resting on said first valve seat means and extending through said first compartment into said aperture, said spacer sleeve being provided with port means for allowing fluid flow from said inlet into said spacer sleeve; a second valve seat means disposed in said aperture and resting on said first spacer sleeve; a bonnet removably secured in said service opening; a second spacer sleeve extending between said second valve seat means and said bonnet through said second compartment, said spacer sleeve being provided with port means allowing fluid flow from the interior of said second spacer sleeve to said second outlet; a first valve plug engageable with said first valve seat means for closing said first compartment from said first outlet; a second valve plug engageable with said second valve seat means for closing said aperture; means biasing said valve plugs in opposite directions toward normally closed position; a stem extending from without said valve body through an opening provided in said bonnet, said compartment and said aperture into said first compartment, said plugs being mounted on said stem, said stem being slidable with respect to said plugs and being provided with oppositely facing stop means, one of said stop means engaging one of said plugs to move it to open position when the stem is moved in one direction and the other of said stop means engaging the other plug to move it to open position when the stem is moved in a direction opposite to said one direction; said stop means confining said valve plugs on said stem; shield means comprising a shield sleeve extending between said valve plugs, said sleeve cooperating with said valve plugs to define a chamber within said sleeve and between said valve plugs, said valve plugs extending outwardly from said sleeve into the fluid flow path from said inlet to said valve seat means; said valve plugs having means thereon confining said sleeve slidably between said valve plugs; said stem, shield sleeve and valve plugs being removable as a unit from said body through said service opening when said bonnet is removed therefrom; and resilient seal means between said valve seat means and said body, between said valve plugs and said shield sleeve and between said valve plugs and said stem; each of said valve plugs and said sleeve having engageable seal surfaces for effecting a secondary seal therebetween.

6. A three-way valve comprising: a valve body having a pair of aligned compartments, an inlet and a first outlet communicating with the first of said compartments, a second outlet communicating with the second of said compartments, an aperture providing communication between said first and second compartments, and a service opening communicating with said second compartment and aligned with said aperture; a first valve seat means disposed in said first compartment between said inlet and said first outlet; a spacer sleeve resting on said first valve seat means and extending through said first compartment into said aperture, said spacer sleeve having port means permitting fluid flow from said inlet into said spacer sleeve; a second valve seat means disposed in said aperture and resting on said first spacer sleeve; a bonnet removably secured in said service opening; a second spacer sleeve extending between said second valve seat means and said bonnet through said second compartment, said second spacer sleeve having port means permitting fluid flow from within said spacer sleeve to said second outlet; a first valve plug engageable with said first valve seat means for closing said first compartment from said first outlet; a second valve plug engageable with said second valve seat means for closing said aperture; means biasing said valve plugs in opposite directions toward normally closed position; a stem extending from without said valve body through an opening provided in said bonnet, said compartment and said aperture into said first compartment, said plugs being mounted on said stem, said stem being slidable with respect to said plugs and being provided with oppositely facing stop means, one of said stop means engaging one of said plugs to move it to open position when the stem is moved in one direction and the other of said stop means engaging the other plug to move it to open position when the stem is moved in a direction opposite to said one direction; said stop means confining said valve plugs on said stem therebetween; shield means comprising a shield sleeve extending between said valve plugs in sealing engagement therewith to define a fluid tight chamber within said shield sleeve between said valve plugs; said stem, shield sleeve and valve plugs being removable as a unit from said body through said service opening when said bonnet is removed therefrom; and resilient seal means between said valve seat means and said body, between said valve plugs and said shield sleeve and between said valve plugs and said stem; each of said valve plugs and said sleeve having engageable seal surfaces for effecting a secondary seal therebetween; each of said valve plugs and said stem having engageable seal surfaces for effecting a secondary seal therebetween.

7. A three-way valve comprising: a valve body having a pair of compartments, an inlet and a first outlet communicating with the first of said compartments, a second outlet communicating with the second of said compartments, and an aperture providing communication between said first and second compartments; a first valve plug for closing said first compartment from said first outlet; a second valve plug for closing said aperture; means biasing said valve plugs in opposite directions toward normally closed positions; a stem extending from without the valve body through said second compartment and said aperture into said first compartment; said plugs being mounted on said stem; said stem being slidable with respect to said plugs and being provided with oppositely facing stop means, one of said stop means engaging one of the plugs to move it to open position when the stem is moved in one direction, and the other of said stop means engaging the other plug to move it to open position when the stem is moved in a direction opposite to said one direction; said stop means confining said plugs on said stem therebetween; shielding means comprising a sleeve extending between said valve plugs in sealing engagement therewith defining a fluid tight chamber within said sleeve between said plugs; said plugs each having exposed areas projecting from the ends of said sleeve and exposed to the pressure of the fluids flowing from the inlet toward the outlets whereby such pressure biases said plugs toward closed positions; and means for conducting a variable fluid pressure into said chamber to act on said valve plugs to also bias said plugs toward closed positions; piston means on said stem slidable in said body in sealing engagement therewith and spaced from said second compartment; and means for conducting said variable fluid pressure from said chamber to said body to act on said piston means to counterbalance the fluid pressure acting on the end of the stem at the outlet which tend to move the stem in one direction to move a plug to its open position.

8. A three-way valve comprising: a valve body having a pair of compartments, an inlet and a first outlet communicating with the first of said compartments, a second outlet communicating with the second of said compartments, and an aperture providing communication between said first and second compartments; a first valve plug for closing said first compartment from said first outlet; a second valve plug for closing said aperture; means biasing said valve plugs in opposite directions toward normally closed positions; a stem extending from without the valve body through said second compartment and said aperture into said first compartment; said plugs being mounted on said stem; said stem being slidable with respect to said plugs and being provided with oppositely facing stop means, one of said stop means engaging one of the plugs to move it to open position when the stem is moved in one direction, and the other of said stop means engaging the other plug to move it to open position when the stem is moved in a direction opposite to said one direction; said stop means confining said plug means on said valve stem; shielding means comprising a sleeve extending between said valve plugs in sealing engagement therewith to provide a fluid tight chamber within said sleeve between said valve plugs, said valve plugs extending outwardly from said sleeve toward closed positions and each having a surface thereon exposed to fluid pressure from said inlet tending to bias said plug toward closed position; means for conducting a variable fluid pressure into the sleeve between the valve plugs, said variable fluid pressure also providing a counteracting force on the valve plugs to balance downstream back pressures at an outlet which tend to move the corresponding valve plug to its open position, said stem having an external flange thereon in sealing engagement with the valve body; and means for conducting said variable fluid pressure from said fluid tight chamber to said valve body to act on said flange to tend to move said stem in a direction opposite to said one direction.

References Cited in the file of this patent

UNITED STATES PATENTS

| | | |
|---|---|---|
| 1,036,451 | Casper | Aug. 20, 1912 |
| 1,799,113 | Meidbrodt | Mar. 31, 1931 |
| 1,884,458 | Willenborg | Oct. 25, 1932 |
| 2,783,020 | Kleczek | Feb. 26, 1957 |
| 2,786,487 | Spence | Mar. 26, 1957 |
| 2,796,885 | Garrett | June 25, 1957 |
| 2,797,061 | Buchanan | June 25, 1957 |
| 2,822,824 | Glower | Feb. 11, 1958 |
| 2,969,811 | Freeman | Jan. 31, 1961 |